United States Patent
Zhao et al.

(10) Patent No.: US 10,354,353 B2
(45) Date of Patent: Jul. 16, 2019

(54) DIGITAL VIDEO CONTENT SECURITY AUTHENTICATION METHOD AND SYSTEM

(71) Applicant: SHENZHEN UNIVERSITY, Shenzhen, Guangdong (CN)

(72) Inventors: Dongning Zhao, Guangdong (CN); Yong Zhang, Guangdong (CN); Shengli Zhang, Guangdong (CN); Yong Xu, Guangdong (CN); Jianyong Chen, Guangdong (CN); Yanshan Li, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 15/571,857

(22) PCT Filed: Jul. 13, 2016

(86) PCT No.: PCT/CN2016/089897
§ 371 (c)(1),
(2) Date: Nov. 6, 2017

(87) PCT Pub. No.: WO2018/010118
PCT Pub. Date: Jan. 18, 2018

(65) Prior Publication Data
US 2018/0322604 A1    Nov. 8, 2018

(51) Int. Cl.
*G06K 9/00* (2006.01)
*G06T 1/00* (2006.01)
*H04N 21/8358* (2011.01)

(52) U.S. Cl.
CPC .......... *G06T 1/0021* (2013.01); *G06T 1/0028* (2013.01); *G06T 2201/0051* (2013.01);
(Continued)

(58) Field of Classification Search
CPC .......... G06T 1/0021; H04N 21/8358
(Continued)

(56) References Cited

U.S. PATENT DOCUMENTS

| | | | | |
|---|---|---|---|---|
| 2002/0164047 | A1* | 11/2002 | Yuval | G06F 21/10 382/100 |
| 2004/0125125 | A1* | 7/2004 | Levy | H04N 21/8352 715/716 |
| 2009/0079847 | A1* | 3/2009 | Ohtsuka | G11B 27/28 348/231.2 |

FOREIGN PATENT DOCUMENTS

| | | | | |
|---|---|---|---|---|
| CN | 101651834 | * | 2/2012 | ........... H04N 19/467 |
| CN | 103617589 A | | 3/2014 | |

(Continued)

OTHER PUBLICATIONS

International Search Report of PCT Patent Application No. PCT/CN2016/089897 dated Apr. 11, 2017.

*Primary Examiner* — Amara Abdi

(57) ABSTRACT

The disclosure provides a digital video content security authentication method, wherein the method comprises: a secret information embedding step of selectively modifying a pixel grayscale value for each frame image in a digital video so as to complete the embedding of 1-bit secret information; and a secret information extraction and video authentication step of carrying out secret information extraction from the digital video in which the secret information is embedded according to a key so as to realize the security authentication of the digital video content. The disclosure also provides a digital video content security authentication system. According to the technical scheme provided by the disclosure, the authentication security is improved on the basis of not influencing user experience.

5 Claims, 2 Drawing Sheets

(52) U.S. Cl.
CPC ............... *G06T 2201/0061* (2013.01); *G06T 2201/0065* (2013.01); *H04N 21/8358* (2013.01)

(58) Field of Classification Search
USPC .......................................... 382/100
See application file for complete search history.

(56) References Cited

FOREIGN PATENT DOCUMENTS

| | | | | |
|---|---|---|---|---|
| CN | 105592323 | * | 5/2016 | ........... H04N 19/182 |
| CN | 105592323 A | | 5/2016 | |

* cited by examiner

DIGITAL VIDEO CONTENT SECURITY AUTHENTICATION METHOD AND SYSTEM

TECHNICAL FIELD

The disclosure relates to the field of multimedium content security technologies, and in particular to a digital video content security authentication method and a digital video content security authentication system.

BACKGROUND

With the rapid development of internet, mobile internet and multimedia technologies, the collection, processing and propagation of digital videos become more and more convenient, however, the reality and completeness of the objective scenes reflected by the digital video content get more and more concerns by scholars, society and governments; the importance of the security authentication and identification of the content of these digital videos is not only limited to the security problem of multimedia contents, but also is related to social harmony and stability, social credibility, judicial fairness and other social problems.

However, present digital video content authentication methods mostly have certain damage to the video itself and influence users' appreciation for the digital video, furthermore, the methods are complicate, and the imperceptibility and vulnerability are poor.

SUMMARY

In view of this, the purpose of the disclosure lies in providing a digital video content security authentication method and a digital video content security authentication system, so as to solve the problems in existing technologies that the security authentication of the digital video content influences user experience, the authentication method is complicate, and the imperceptibility and vulnerability are poor.

The disclosure provides a digital video content security authentication method, characterized in that the method includes:

a secret information embedding step of selectively modifying a pixel grayscale value for each frame image in a digital video so as to complete the embedding of 1-bit secret information; and a secret information extraction and video authentication step of carrying out secret information extraction from the digital video in which the secret information is embedded according to a key so as to realize the security authentication of the digital video content.

Preferably, the secret information embedding step includes:

reading each frame image $I(j)$ in the digital video V frame by frame in sequence, where $j=0, 1, \ldots, t-1$, t representing the total number of frames in the digital video V;

acquiring any one frame image in the read digital video V, determining the size of the frame image and marking as m×n, where m represents the number of rows of the frame image and n represents the number of columns of the frame image, wherein, in the frame image, each pixel has a coordinate, the coordinate of the bottom left corner pixel position is (0,0) and the coordinate of the top right corner pixel position is (m−1, n−1);

converting the secret information to be embedded into a bit sequence $w(i)$, $i=0, 1, \ldots, s-1$; if the secret information is a character string, expressing the length of the character string using $m_1$ and taking it as a key2; if the secret information is a binary image, performing raster scanning on the binary image to obtain a bit sequence, the size of the bit sequence being $s=m_1 \times n_1$, where $m_1$ and $n_1$ respectively represent the number of rows and the number of columns of the binary image, at this time, $m_1$ and $n_1$ serving as a key2;

setting tt=0, ss=0;

reading the bit information $w(ss)$ in the bit sequence;

reading a selected image block $B(tt)$ obtained in a frame image $I(tt)$, the bottom left corner position coordinate of the selected image block $B(tt)$ being $(x,y)$ and the top right corner position coordinate thereof being $(x-1+\text{half\_m}, y-1+\text{half\_n})$, the size of the selected image block $B(tt)$ being half_m×half_n, where $0 \leq x < \text{half\_m}$, $0 \leq y < \text{half\_n}$, x=V_key mod half_m, y=V_key mod half_n, V_key=MD5(key1), half_m=Trunc(m/2), half_n=Trunc(n/2), key1 is a key, MD5 is a Hash function, Trunc( ) is a truncate function, and mod is a modulus function;

calculating a grayscale value mean mean(tt) for each pixel point in the selected image block $B(tt)$;

selecting the pixel points in the selected image block $B(tt)$ with grayscale values not less than the grayscale value mean mean(tt) to compose a set H_set, calculating the number $H(tt)$ of elements in the set H_set, and calculating the position coordinate (Hx,Hy) and the grayscale value H_v=p(Hx,Hy) that are corresponding to the pixel point with the minimum grayscale value in the set H_set;

selecting the pixel points in the selected image block $B(tt)$ with grayscale values less than the grayscale value mean mean(tt) to compose a set L_set, and calculating the position coordinate (Lx,Ly) and the grayscale value L_v=p(Lx,Ly) that are corresponding to the pixel point with the maximum grayscale value in the set L_set;

completing the embedding of 1-bit secret information according to the value of the bit information $w(ss)$ and the parity of the element number $H(tt)$;

calculating ss=(ss+1) mod s, if tt+1<t, then tt=tt+1; and traversing all the frame images in the digital video V, ending the secret information embedding process after the secret bit information is embedded in sequence, and acquiring a digital video V' containing secret information.

Preferably, the step of completing the embedding of 1-bit secret information according to the value of the bit information $w(ss)$ and the parity of the element number $H(tt)$ specifically includes:

if the element number $H(tt)=\text{half\_m} \times \text{half\_n}$, not performing the secret information embedding operation on the selected image block;

otherwise, if $w(ss)=0$ and $H(tt)$ is an even number, or $w(ss)=1$ and $H(tt)$ is an odd number, not performing any operation on the selected image block $B(tt)$, that is, the embedding of 1-bit secret information being completed;

otherwise, if $w(ss)=0$ and $H(tt)=1$, enabling $p(Lx,Ly)=p(Hx,Hy)$;

otherwise, if $w(ss)=0$, $H(tt)$ is an odd number, and H_v−mean(tt) ≤ mean(tt)−L_v, then $p(Hx,Hy)=p(Lx,Ly)$;

otherwise, if $w(ss)=0$, $H(tt)$ is an odd number, and H_v−mean(tt) > mean(tt)−L_v, then $p(Lx,Ly)=p(Hx,Hy)$;

otherwise, if $w(ss)=1$, $H(tt)$ is an even number, and H_v−mean(tt) > mean(tt)−L_v, then $p(Lx,Ly)=p(Hx,Hy)$; and otherwise, if $w(ss)=1$, $H(tt)$ is an even number, and H_v−mean(tt) ≤ mean(tt)−L_v, then $p(Hx,Hy)=p(Lx,Ly)$.

Preferably, the secret information extraction and video authentication step specifically includes:

reading each frame image I'(j) in a digital video V' to be authenticated frame by frame in sequence, where j=0, 1, . . . , t'−1, t' representing the total number of frames in the digital video V';

acquiring any one frame image in the read digital video V', determining the size of the frame image and marking as m'×n', where m' represents the number of rows of the frame image and n' represents the number of columns of the frame image, and determining the position coordinate of each pixel in the frame image in sequence, the coordinate of the bottom left corner pixel position being (0,0) and the coordinate of the top right corner pixel position being (m'−1, n'−1);

setting tt=0, w=" ";

reading a to-be-authenticated image block B'(tt) obtained in a frame image I'(tt), the bottom left corner position coordinate of the to-be-authenticated image block B'(tt) being (x,y) and the top right corner position coordinate thereof being (x−1+half_m', y−1+half_n'), the size of the to-be-authenticated image block B'(tt) being half_m'×half_n', where $0 \leq x < $half_m', $0 \leq y < $half_n', x=V_key mod half_m', y=V_key mod half_n', where V_key=MD5(key1), half_m'=Trunc(m'/2), half_n'=Trunc(n'/2), key1 is a key, MD5 is a Hash function, Trunc( ) is a truncate function, and mod is a modulus function;

calculating a grayscale value mean mean'(tt) for each pixel point in the to-be-authenticated image block B'(tt);

selecting the pixel points in the to-be-authenticated image block B'(tt) with grayscale values not less than the grayscale value mean mean'(tt) to compose a set H'_set, and calculating the number H'(tt) of elements in the set H'_set;

if H'(tt)=half_m'×half_n', not performing extraction operation on the to-be-authenticated image block B'(tt);

otherwise, if H'(tt) is an even number, then w=w∥ "0", where "∥" indicates string concatenation;

otherwise, if H'(tt) is an odd number, then w=w∥"1", where "∥" indicates string concatenation;

if tt+1<t', then tt=tt+1;

traversing all the frame images in the digital video V' to be authenticated and extracting a secret bit string w; and carrying out a bit string restoration and a secret information restoration from the extracted secret bit string w through a voting model according to the key2, and then judging according to the restored secret information whether the content of the digital video has been tampered so as to realize the security authentication of the digital video content.

In another aspect, the disclosure further provides a digital video content security authentication system, including:

a secret information embedding module, which is configured to selectively modify a pixel grayscale value for each frame image in a digital video so as to complete the embedding of 1-bit secret information; and a secret information extraction and video authentication module, which is configured to carry out secret information extraction from the digital video in which the secret information is embedded according to a key so as to realize the security authentication of the digital video content.

Preferably, the secret information embedding module is specifically configured to:

read each frame image I(j) in the digital video V frame by frame in sequence, where j=0, 1, . . . , t−1, t representing the total number of frames in the digital video V;

acquire any one frame image in the read digital video V, determine the size of the frame image and mark as m×n, where m represents the number of rows of the frame image and n represents the number of columns of the frame image, wherein, in the frame image, each pixel has a coordinate, the coordinate of the bottom left corner pixel position is (0,0) and the coordinate of the top right corner pixel position is (m−1, n−1);

convert the secret information to be embedded into a bit sequence w(i), i=0, 1, . . . , s−1; if the secret information is a character string, express the length of the character string using $m_1$ and take it as a key2; if the secret information is a binary image, perform raster scanning on the binary image to obtain a bit sequence, the size of the bit sequence being $s=m_1 \times n_1$, where $m_1$ and $n_1$ respectively represent the number of rows and the number of columns of the binary image, at this time, $m_1$ and $n_1$ serving as a key2;

set tt=0, ss=0;

read the bit information w(ss) in the bit sequence;

read a selected image block B(tt) obtained in a frame image I(tt), the bottom left corner position coordinate of the selected image block B(tt) being (x,y) and the top right corner position coordinate thereof being (x−1+half_m, y−1+half_n), the size of the selected image block B(tt) being half_m×half_n, where $0 \leq x < $half_m, $0 \leq y < $half_n, x=V_key mod half_m, y=V_key mod half_n, V_key=MD5(key1), half_m=Trunc(m/2), half_n=Trunc(n/2), key1 is a key, MD5 is a Hash function, Trunc( ) is a truncate function, and mod is a modulus function;

calculate a grayscale value mean mean(tt) for each pixel point in the selected image block B(tt);

select the pixel points in the selected image block B(tt) with grayscale values not less than the grayscale value mean mean(tt) to compose a set H_set, calculate the number H(tt) of elements in the set H_set, and calculate the position coordinate (Hx,Hy) and the grayscale value H_v=p(Hx,Hy) that are corresponding to the pixel point with the minimum grayscale value in the set H_set;

select the pixel points in the selected image block B(tt) with grayscale values less than the grayscale value mean mean(tt) to compose a set L_set, and calculate the position coordinate (Lx,Ly) and the grayscale value L_v=p(Lx,Ly) that are corresponding to the pixel point with the maximum grayscale value in the set L_set;

complete the embedding of 1-bit secret information according to the value of the bit information w(ss) and the parity of the element number H(tt);

calculate ss=(ss+1) mod s, if tt+1<t, then tt=tt+1; and traverse all the frame images in the digital video V, end the secret information embedding process after the secret bit information is embedded in sequence, and acquire a digital video V' containing secret information.

Preferably, the secret information extraction and video authentication module is specifically configured to:

read each frame image I'(j) in a digital video V' to be authenticated frame by frame in sequence, where j=0, 1, . . . , t'−1, t' representing the total number of frames in the digital video V';

acquire any one frame image in the read digital video V', determine the size of the frame image and mark as m'×n', where m' represents the number of rows of the frame image and n' represents the number of columns of the frame image, and determine the position coordinate of each pixel in the frame image in sequence, the coordinate of the bottom left corner pixel position being (0,0) and the coordinate of the top right corner pixel position being (m'−1, n'−1);

set tt=0, w=" ";

read a to-be-authenticated image block B'(tt) obtained in a frame image I'(tt), the bottom left corner position coordinate of the to-be-authenticated image block B'(tt) being (x,y) and the top right corner position coordinate thereof being (x−1+half_m', y−1+half_n'), the size of the to-be-authenticated image block B'(tt) being half_m'×half_n', where 0≤x<half_m', 0≤y<half_n', x=V_key mod half_m', y=V_key mod half_n', where V_key=MD5(key1), half_m'=Trunc(m'/2), half_n'=Trunc(n'/2), key1 is a key, MD5 is a Hash function, Trunc( ) is a truncate function, and mod is a modulus function;

calculate a grayscale value mean mean'(tt) for each pixel point in the to-be-authenticated image block B'(tt);

select the pixel points in the to-be-authenticated image block B'(tt) with grayscale values not less than the grayscale value mean mean'(tt) to compose a set H'_set, and calculate the number H'(tt) of elements in the set H'_set;

if H'(tt)=half_m'×half_n', not perform extraction operation on the to-be-authenticated image block B'(tt);

otherwise, if H'(tt) is an even number, then w=w∥ "0", where "∥" indicates string concatenation;

otherwise, if H'(tt) is an odd number, then w=w∥"1", where "∥" indicates string concatenation;

if tt+1<t', then tt=tt+1;

traverse all the frame images in the digital video V' to be authenticated and extract a secret bit string w; and carry out a bit string restoration and a secret information restoration from the extracted secret bit string w through a voting model according to the key2, and then judge according to the restored secret information whether the content of the digital video has been tampered so as to realize the security authentication of the digital video content.

The technical scheme provided by the disclosure uses a digital video to serve as a carrier, and determines in the frame image of the digital video a secret image block to hide the secret information used for authentication according to a key and a Hash function; this method only needs to modify the grayscale value of one pixel to complete the embedding of 1-bit secret information; the method is difficult to be sensed, does not influence user experience and has very high security; moreover, the distortion caused to the digital video is as small as possible, and the vulnerability is fine; therefore, the method can realize the security authentication for the reality and completeness of the digital video content.

DESCRIPTION OF THE EMBODIMENTS

To make the purpose, the technical scheme and the advantages of the disclosure better understood, the disclosure is described below in further detail in conjunction with the drawings and embodiments. It should be understood that the specific embodiments described below are merely to illustrate, but to limit, the disclosure.

A specific implementation of the disclosure provides a digital video content security authentication method, wherein the method mainly includes the following steps:

S11: a secret information embedding step of selectively modifying a pixel grayscale value for each frame image in a digital video so as to complete the embedding of 1-bit secret information; and S12: a secret information extraction and video authentication step of carrying out secret information extraction from the digital video in which the secret information is embedded according to a key so as to realize the security authentication of the digital video content.

The digital video content security authentication method provided by the disclosure uses a digital video to serve as a carrier, and determines in the frame image of the digital video a secret image block to hide the secret information used for authentication according to a key and a Hash function; this method only needs to modify the grayscale value of one pixel to complete the embedding of 1-bit secret information; the method is difficult to be sensed, does not influence user experience and has very high security; moreover, the distortion caused to the digital video is as small as possible, and the vulnerability is fine; therefore, the method can realize the security authentication for the reality and completeness of the digital video content.

The digital video content security authentication method provided by the disclosure is described below in detail.

Figure 1:
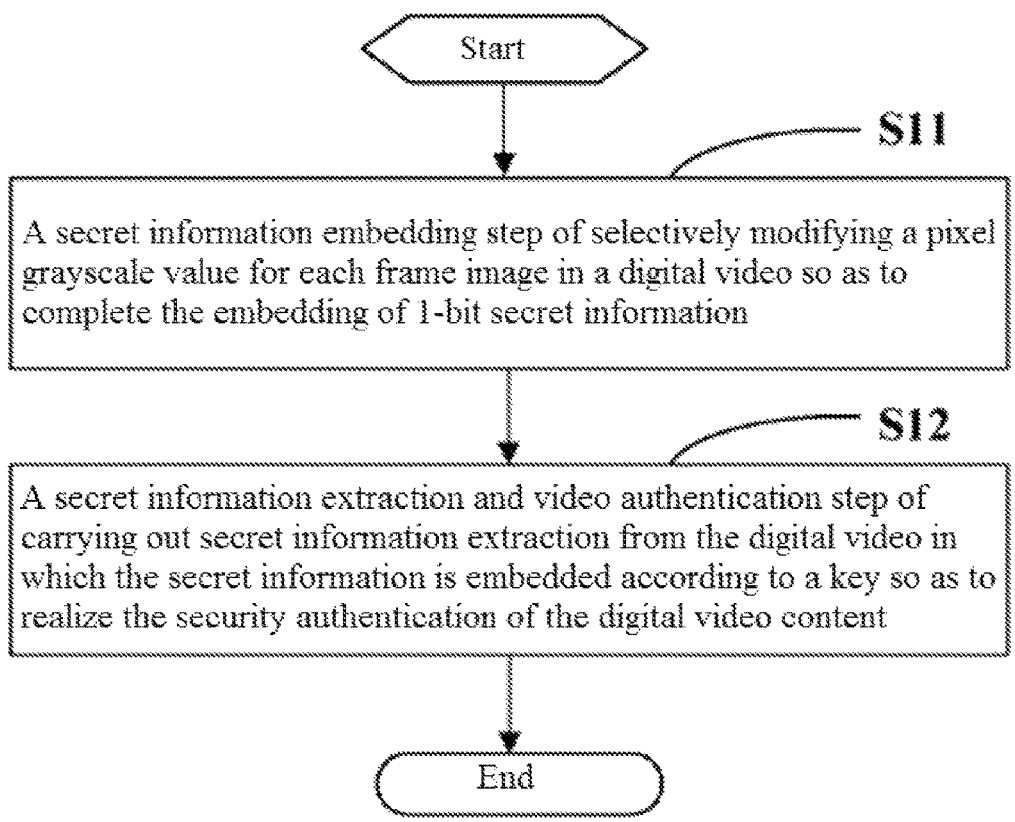
FIG. 1 is a flowchart illustrating a digital video content security authentication method in an implementation of the disclosure.

Please refer to FIG. 1, which shows a flowchart illustrating a digital video content security authentication method in an implementation of the disclosure.

In S11, a secret information embedding step includes selectively modifying a pixel grayscale value for each frame image in a digital video so as to complete the embedding of 1-bit secret information.

In this implementation, the secret information embedding step S11 specifically includes S1101 to S1112, totally 12 substeps, as below.

In S1101, each frame image I(j) in the digital video V is read frame by frame in sequence, where j=0, 1, . . . , t−1, t represents the total number of frames in the digital video V.

In S1102, any one frame image is acquired in the read digital video V, the size of the frame image is determined and marked as m×n, where m represents the number of rows of the frame image and n represents the number of columns of the frame image, wherein, in the frame image, each pixel has a coordinate, the coordinate of the bottom left corner pixel position is (0,0) and the coordinate of the top right corner pixel position is (m−1, n−1).

In S1103, the secret information to be embedded is converted into a bit sequence w(i), i=0, 1, . . . , s−1; if the secret information is a character string, the length of the character string is expressed using $m_1$ and it is taken as a key2; if the secret information is a binary image, raster scanning is performed on the binary image to obtain a bit sequence, the size of the bit sequence being s=$m_1$×$n_1$, where $m_1$ and $n_1$ respectively represent the number of rows and the number of columns of the binary image, at this time, $m_1$ and $n_1$ serve as a key2;

In S1104, tt=0, ss=0 are set.

In S1105, the bit information w(ss) in the bit sequence is read.

In S1106, a selected image block B(tt) obtained in a frame image I(tt) is read, the bottom left corner position coordinate of the selected image block B(tt) is (x,y) and the top right corner position coordinate thereof is (x−1+half_m, y−1+half_n), the size of the selected image block B(tt) is half_m× half_n, where 0≤x<half_m, 0≤y<half_n, x=V_key mod half_m, y=V_key mod half_n, V_key=MD5(key1), half_m=Trunc(m/2), half_n=Trunc(n/2), key1 is a key, MD5 is a Hash function, Trunc( ) is a truncate function, and mod is a modulus function.

In S1107, a grayscale value mean mean(tt) is calculated for each pixel point in the selected image block B(tt). In this implementation, $$\mathrm{mean}(tt) = \frac{1}{half\_m \times half\_n} \sum_{i=x}^{x-1+half\_m} \sum_{j=y}^{y-1+half\_n} p(i, j),$$

where p(i,j) expresses the pixel grayscale value of the position (i,j) in the frame image; if the selected image block B(tt) is a color image, the green value (that is, G value) of the pixel point at this position in the color image is taken as the grayscale value to calculate.

In S1108, the pixel points in the selected image block B(tt) with grayscale values not less than the grayscale value mean mean(tt) are selected to compose a set H_set, the number H(tt) of elements in the set H_set is calculated, and the position coordinate (Hx,Hy) and the grayscale value H_v=p(Hx,Hy) that are corresponding to the pixel point with the minimum grayscale value in the set H_set are calculated. In this implementation, if there is more than one pixel point with the minimum grayscale value, one pixel point is selected randomly.

In S1109, the pixel points in the selected image block B(tt) with grayscale values less than the grayscale value mean mean(tt) are selected to compose a set L_set, and the position coordinate (Lx,Ly) and the grayscale value L_v=p(Lx,Ly) that are corresponding to the pixel point with the maximum grayscale value in the set L_set are calculated.

In S1110, the embedding of 1-bit secret information is completed according to the value of the bit information w(ss) and the parity of the element number H(tt). In this implementation, S1110 specifically includes:

if the element number H(tt)=half_m×half_n, not performing the secret information embedding operation on the selected image block;

otherwise, if w(ss)=0 and H(tt) is an even number, or w(ss)=1 and H(tt) is an odd number, not performing any operation on the selected image block B(tt), that is, the embedding of 1-bit secret information being completed;

otherwise, if w(ss)=0 and H(tt)=1, enabling p(Lx,Ly)=p(Hx,Hy);

otherwise, if w(ss)=0, H(tt) is an odd number, and H_v-mean(tt)≤mean(tt)-L_v, then p(Hx,Hy)=p(Lx,Ly);

otherwise, if w(ss)=0, H(tt) is an odd number, and H_v-mean(tt)>mean(tt)-L_v, then p(Lx,Ly)=p(Hx,Hy);

otherwise, if w(ss)=1, H(tt) is an even number, and H_v-mean(tt)>mean(tt)-L_v, then p(Lx,Ly)=p(Hx,Hy); and otherwise, if w(ss)=1, H(tt) is an even number, and H_v-mean(tt)≤mean(tt)-L_v, then p(Hx,Hy)=p(Lx,Ly).

In S1111, ss=(ss+1) mod s is calculated, if tt+1<t, then tt=tt+1.

In S1112, all the frame images in the digital video V are traversed, the secret information embedding process is ended after the secret bit information is embedded in sequence, and a digital video V' containing secret information is acquired.

In S12, a secret information extraction and video authentication step includes carrying out secret information extraction from the digital video in which the secret information is embedded according to a key so as to realize the security authentication of the digital video content.

In this implementation, the secret information extraction and video authentication step S12 specifically includes S1201 to S1212, totally, 12 substeps, as below.

In S1201, each frame image I'(j) in a digital video V' to be authenticated is read frame by frame in sequence, where j=0, 1, . . . , t'−1, t' represents the total number of frames in the digital video V'.

In S1202, any one frame image is acquired in the read digital video V', the size of the frame image is determined and marked as m'×n', where m' represents the number of rows of the frame image and n' represents the number of columns of the frame image, and the position coordinate of each pixel in the frame image is determined in sequence, the coordinate of the bottom left corner pixel position is (0,0) and the coordinate of the top right corner pixel position is (m'−1, n'−1).

In S1203, tt=0, w=" " are set.

In S1204, a to-be-authenticated image block B'(tt) obtained in a frame image I'(tt) is read, the bottom left corner position coordinate of the to-be-authenticated image block B'(tt) is (x,y) and the top right corner position coordinate thereof is (x−1+half_m', y−1+half_n'), the size of the to-be-authenticated image block B'(tt) is half_m'×half_n', where 0≤x<half_m', 0≤y<half_n', x=V_key mod half_m', y=V_key mod half_n', where V_key=MD5(key1), half_m'=Trunc(m'/2), half_n'=Trunc(n'/2), key1 is a key, MD5 is a Hash function, Trunc( ) is a truncate function, and mod is a modulus function. In this implementation, the value of V_key=MD5(key) is calculated according to the key1 and a Hash function (for example, MD5).

In S1205, a grayscale value mean mean'(tt) is calculated for each pixel point in the to-be-authenticated image block B'(tt). In this implementation, $$\mathrm{mean}'(tt) = \frac{1}{half\_m' \times half\_n'} \sum_{i=x}^{x-1+half\_m'} \sum_{j=y}^{y-1+half\_n'} p(i, j),$$

where p(i,j) expresses the pixel grayscale value of the position (i,j) in the frame image; if the selected image block B(tt) is a color image, the green value (that is, G value) of the pixel point at this position in the color image is taken as the grayscale value to calculate.

In S1206, the pixel points in the to-be-authenticated image block B'(tt) with grayscale values not less than the grayscale value mean mean'(tt) are selected to compose a set H'_set, and the number H'(tt) of elements in the set H'_set is calculated.

In S1207, if H'(tt)=half_m'×half_n', extraction operation is not performed on the to-be-authenticated image block B'(tt). In this implementation, at this time, if tt+1<t', then, tt=tt+1, and go to S1204; otherwise, go to S1211.

In S1208, otherwise, if H'(tt) is an even number, then w=w|| "0", where "||" indicates string concatenation; if tt+1<t', then, tt=tt+1, and go to S1204.

In S1209, otherwise, if H'(tt) is an odd number, then w=w|| "1", where "||" indicates string concatenation; if tt+1<t', then, tt=tt+1, and go to S1204.

In S1210, if tt+1<t', then tt=tt+1.

In S1211, all the frame images in the digital video V' to be authenticated are traversed and a secret bit string w is extracted.

In S1212, a bit string restoration and a secret information restoration are carried out from the extracted secret bit string w through a voting model according to the key2, and then it is judged according to the restored secret information whether the content of the digital video has been tampered so as to realize the security authentication of the digital video content.

The digital video content security authentication method provided by the disclosure uses a digital video to serve as a carrier, and determines in the frame image of the digital video a secret image block to hide the secret information used for authentication according to a key and a Hash function; this method only needs to modify the grayscale value of one pixel to complete the embedding of 1-bit secret information; the method is difficult to be sensed, does not influence user experience and has very high security; moreover, the distortion caused to the digital video is as small as possible, and the vulnerability is fine; therefore, the method can realize the security authentication for the reality and completeness of the digital video content.

The specific implementation of the disclosure further provides a digital video content security authentication system 10, mainly including:

a secret information embedding module 11, which is configured to selectively modify a pixel grayscale value for each frame image in a digital video so as to complete the embedding of 1-bit secret information; and a secret information extraction and video authentication module 12, which is configured to carry out secret information extraction from the digital video in which the secret information is embedded according to a key so as to realize the security authentication of the digital video content.

The digital video content security authentication system 10 provided by the disclosure uses a digital video to serve as a carrier, and determines in the frame image of the digital video a secret image block to hide the secret information used for authentication according to a key and a Hash function; this method only needs to modify the grayscale value of one pixel to complete the embedding of 1-bit secret information; the method is difficult to be sensed, does not influence user experience and has very high security; moreover, the distortion caused to the digital video is as small as possible, and the vulnerability is fine; therefore, the method can realize the security authentication for the reality and completeness of the digital video content.

Figure 2:
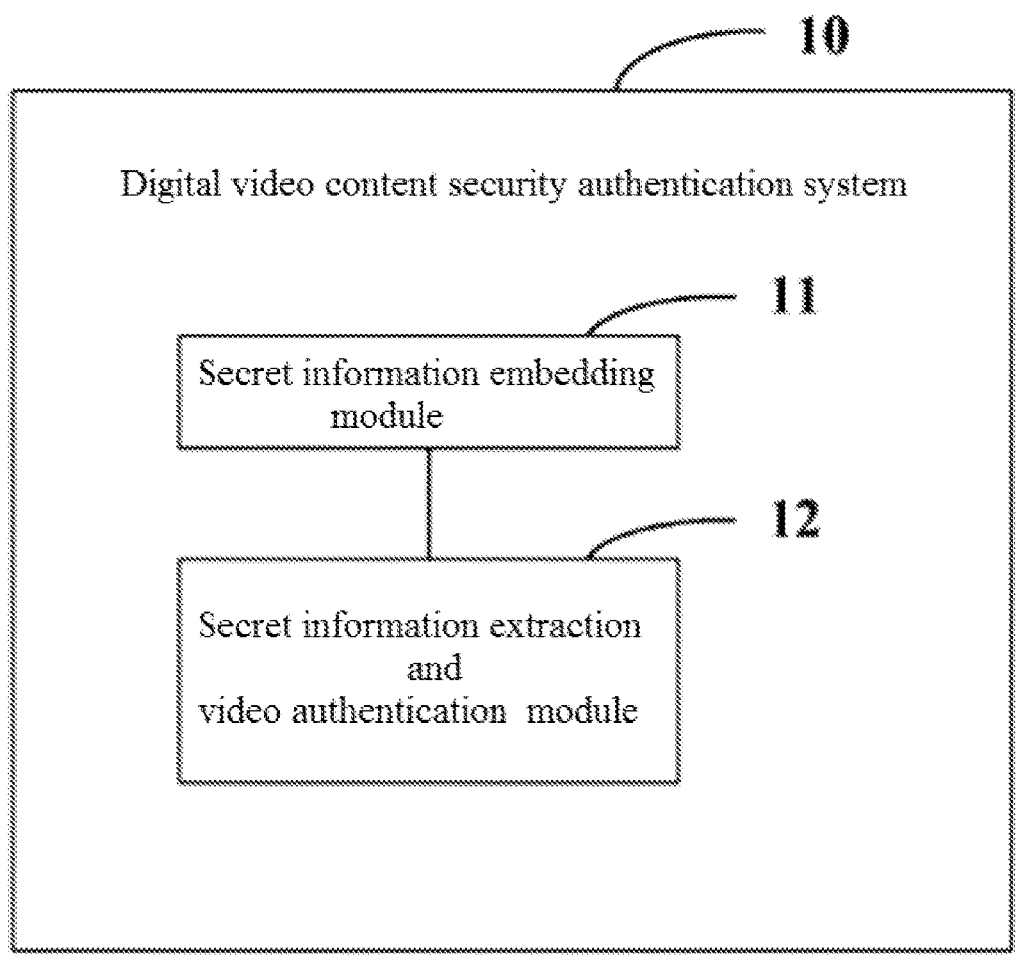
FIG. 2 is a diagram illustrating an internal structure of a digital video content security authentication system 10 in an implementation of the disclosure.

Refer to FIG. 2, which shows a diagram illustrating a structure of a digital video content security authentication system 10 in an implementation of the disclosure.

In this implementation, the digital video content security authentication system 10 manly includes a secret information embedding module 11 and a secret information extraction and video authentication module 12.

The secret information embedding module 11 is configured to selectively modify a pixel grayscale value for each frame image in a digital video so as to complete the embedding of 1-bit secret information.

In this implementation, the secret information embedding module 11 is specifically configured to:

read each frame image I(j) in the digital video V frame by frame in sequence, where j=0, 1, . . . , t−1, t representing the total number of frames in the digital video V;

acquire any one frame image in the read digital video V, determine the size of the frame image and mark as m×n, where m represents the number of rows of the frame image and n represents the number of columns of the frame image, wherein, in the frame image, each pixel has a coordinate, the coordinate of the bottom left corner pixel position is (0,0) and the coordinate of the top right corner pixel position is (m−1, n−1);

convert the secret information to be embedded into a bit sequence w(i), i=0, 1, . . . , s−1; if the secret information is a character string, express the length of the character string using $m_1$ and take it as a key2; if the secret information is a binary image, perform raster scanning on the binary image to obtain a bit sequence, the size of the bit sequence being $s=m_1 \times n_1$, where $m_1$ and $n_1$ respectively represent the number of rows and the number of columns of the binary image, at this time, $m_1$ and $n_1$ serving as a key2;

set tt=0, ss=0;

read the bit information w(ss) in the bit sequence;

read a selected image block B(tt) obtained in a frame image I(tt), the bottom left corner position coordinate of the selected image block B(tt) being (x,y) and the top right corner position coordinate thereof being (x−1+half_m, y−1+half_n), the size of the selected image block B(tt) being half_m×half_n, where 0≤x<half_m, 0≤y<half_n, x=V_key mod half_m, y=V_key mod half_n, V_key=MD5 (key1), half_m=Trunc(m/2), half_n=Trunc(n/2), key1 is a key, MD5 is a Hash function, Trunc( ) is a truncate function, and mod is a modulus function;

calculate a grayscale value mean mean(tt) for each pixel point in the selected image block B(tt);

select the pixel points in the selected image block B(tt) with grayscale values not less than the grayscale value mean mean(tt) to compose a set H_set, calculate the number H(tt) of elements in the set H_set, and calculate the position coordinate (Hx,Hy) and the grayscale value H_v=p(Hx,Hy) that are corresponding to the pixel point with the minimum grayscale value in the set H_set;

select the pixel points in the selected image block B(tt) with grayscale values less than the grayscale value mean mean(tt) to compose a set L_set, and calculate the position coordinate (Lx,Ly) and the grayscale value L_v=p(Lx,Ly) that are corresponding to the pixel point with the maximum grayscale value in the set L_set;

complete the embedding of 1-bit secret information according to the value of the bit information w(ss) and the parity of the element number H(tt);

calculate ss=(ss+1) mod s, if tt+1<t, then tt=tt+1; and traverse all the frame images in the digital video V, end the secret information embedding process after the secret bit information is embedded in sequence, and acquire a digital video V' containing secret information.

In this implementation, the specific processing flow of the secret information embedding module 11 is as shown in the aforementioned S11, what repeated are omitted here.

The secret information extraction and video authentication module 12 is configured to carry out secret information extraction from the digital video in which the secret information is embedded according to a key so as to realize the security authentication of the digital video content.

In this implementation, the secret information extraction and video authentication module 12 is specifically configured to:

read each frame image I'(j) in a digital video V' to be authenticated frame by frame in sequence, where j=0, 1, . . . , t'−1, t' representing the total number of frames in the digital video V';

acquire any one frame image in the read digital video V', determine the size of the frame image and mark as m'×n', where m' represents the number of rows of the frame image and n' represents the number of columns of the frame image, and determine the position coordinate of each pixel in the frame image in sequence, the coordinate of the bottom left corner pixel position being (0,0) and the coordinate of the top right corner pixel position being (m'−1, n'−1);

set tt=0, w=" ";

read a to-be-authenticated image block B'(tt) obtained in a frame image I'(tt), the bottom left corner position coordinate of the to-be-authenticated image block B'(tt) being (x,y) and the top right corner position coordinate thereof being (x−1+half_m', y−1+half_n'), the size of the to-be-authenticated image block B'(tt) being half_m'×half_n', where $0 \leq x < \text{half\_m}'$, $0 \leq y < \text{half\_n}'$, x=V_key mod half_m', y=V_key mod half_n', where V_key=MD5(key1), half_m'=Trunc(m'/2), half_n'=Trunc(n'/2), key1 is a key, MD5 is a Hash function, Trunc( ) is a truncate function, and mod is a modulus function;

calculate a grayscale value mean mean'(tt) for each pixel point in the to-be-authenticated image block B'(tt);

select the pixel points in the to-be-authenticated image block B'(tt) with grayscale values not less than the grayscale value mean mean'(tt) to compose a set H'_set, and calculate the number H'(tt) of elements in the set H'_set;

if H'(tt)=half_m'×half_n', not perform extraction operation on the to-be-authenticated image block B'(tt);

otherwise, if H'(tt) is an even number, then w=w|| "0", where "||" indicates string concatenation;

otherwise, if H'(tt) is an odd number, then w=w|| "1", where "||" indicates string concatenation;

if tt+1<t', then tt=tt+1;

traverse all the frame images in the digital video V' to be authenticated and extract a secret bit string w; and carry out a bit string restoration and a secret information restoration from the extracted secret bit string w through a voting model according to the key2, and then judge according to the restored secret information whether the content of the digital video has been tampered so as to realize the security authentication of the digital video content.

In this implementation, the specific processing flow of the secret information extraction and video authentication module 12 is as shown in the aforementioned S12, what repeated are omitted here.

The digital video content security authentication system 10 provided by the disclosure uses a digital video to serve as a carrier, and determines in the frame image of the digital video a secret image block to hide the secret information used for authentication according to a key and a Hash function; this method only needs to modify the grayscale value of one pixel to complete the embedding of 1-bit secret information; the method is difficult to be sensed, does not influence user experience and has very high security; moreover, the distortion caused to the digital video is as small as possible, and the vulnerability is fine; therefore, the method can realize the security authentication for the reality and completeness of the digital video content.

It should be noted that, in the above embodiments, each unit is just a division of function logic but is not limited to the above division only if corresponding functions can be realized; in addition, the specific name of each function unit is just for distinguishing conveniently, but for limiting the scope of protection of the disclosure.

In addition, the ordinary staff in this field can understand that the implementation of all or part steps in the above method embodiments may be completed by instructing related hardware through a program; the corresponding program may be stored in a computer readable storage medium; and the storage medium includes, for example, Read-Only Memory (ROM), Random Access Memory (RAM), disk or compact disk, etc.

The above are the preferred embodiments of the disclosure merely, and are not intended to limit the scope of protection of the disclosure. Any modifications, equivalent substitutes and improvements, etc., made within the spirit and principle of the disclosure are intended to be included in the scope of protection of the disclosure.

What is claimed is:

1. A digital video content security authentication method, comprising:

a secret information embedding step of selectively modifying a pixel grayscale value for each frame image in a digital video so as to complete the embedding of 1-bit secret information; and a secret information extraction and video authentication step of carrying out secret information extraction from the digital video in which the secret information is embedded according to a key so as to realize the security authentication of the digital video content;

characterized in that the secret information embedding step comprises:

reading each frame image I(j) in the digital video V frame by frame in sequence, where j=0, 1, . . . , t−1, t representing the total number of frames in the digital video V;

acquiring any one frame image in the read digital video V, determining the size of the frame image and marking as m×n, where m represents the number of rows of the frame image and n represents the number of columns of the frame image, wherein, in the frame image, each pixel has a coordinate, the coordinate of the bottom left corner pixel position is (0,0) and the coordinate of the top right corner pixel position is (m−1, n−1);

converting the secret information to be embedded into a bit sequence w(i), i=0, 1, . . . , s−1; if the secret information is a character string, expressing the length of the character string using $m_1$ and taking it as a key2; if the secret information is a binary image, performing raster scanning on the binary image to obtain a bit sequence, the size of the bit sequence being $s = m_1 \times n_1$, where $m_1$ and $n_1$ respectively represent the number of rows and the number of columns of the binary image, at this time, $m_1$ and $n_1$ serving as a key2;

setting tt=0, ss=0;

reading the bit information w(ss) in the bit sequence;

reading a selected image block B(tt) obtained in a frame image I(tt), the bottom left corner position coordinate of the selected image block B(tt) being (x,y) and the top right corner position coordinate thereof being (x−1+half_m, y−1+half_n), the size of the selected image block B(tt) being half_m×half_n, where $0 \leq x < \text{half\_m}$, $0 \leq y < \text{half\_n}$, x=V_key mod half_m, y=V_key mod half_n, V_key=MD5(key1), half_m=Trunc(m/2), half_n=Trunc(n/2), key1 is a key, MD5 is a Hash function, Trunc( ) is a truncate function, and mod is a modulus function;

calculating a grayscale value mean mean(tt) for each pixel point in the selected image block B(tt);

selecting the pixel points in the selected image block B(tt) with grayscale values not less than the grayscale value mean mean(tt) to compose a set H_set, calculating the number H(tt) of elements in the set H_set, and calculating the position coordinate (Hx,Hy) and the grayscale value H_v=p(Hx,Hy) that are corresponding to the pixel point with the minimum grayscale value in the set H_set;

selecting the pixel points in the selected image block B(tt) with grayscale values less than the grayscale value mean mean(tt) to compose a set L_set, and calculating the position coordinate (Lx,Ly) and the grayscale value L_v=p(Lx,Ly) that are corresponding to the pixel point with the maximum grayscale value in the set L_set;

completing the embedding of 1-bit secret information according to the value of the bit information w(ss) and the parity of the element number H(tt);

calculating ss=(ss+1) mod s, if tt+1<t, then tt=tt+1; and
traversing all the frame images in the digital video V,
ending the secret information embedding process after
the secret bit information is embedded in sequence, and
acquiring a digital video V' containing secret information.

2. The digital video content security authentication method according to claim 1, characterized in that the step of completing the embedding of 1-bit secret information according to the value of the bit information w(ss) and the parity of the element number H(tt) specifically comprises:
if the element number H(t)=half_m×half_n, not performing the secret information embedding operation on the selected image block;
otherwise, if w(ss)=0 and H(tt) is an even number, or w(ss)=1 and H(tt) is an odd number, not performing any operation on the selected image block B(tt), that is, the embedding of 1-bit secret information being completed;
otherwise, if w(ss)=0 and H(tt)=1, enabling p(Lx,Ly)=p(Hx,Hy);
otherwise, if w(ss)=0, H(tt) is an odd number, and H_v-mean(tt)≤mean(tt)-L_v, then p(Hx,Hy)=p(Lx,Ly);
otherwise, if w(ss)=0, H(tt) is an odd number, and H_v-mean(tt)>mean(tt)-L_v, then p(Lx,Ly)=p(Hx,Hy);
otherwise, if w(ss)=1, H(tt) is an even number, and H_v-mean(tt)>mean(tt)-L_v, then p(Lx,Ly)=p(Hx,Hy); and
otherwise, if w(ss)=1, H(tt) is an even number, and H_v-mean(tt)≤mean(tt)-L_v, then p(Hx,Hy)=p(Lx,Ly).

3. The digital video content security authentication method according to claim 1, characterized in that the secret information extraction and video authentication step specifically comprises:
reading each frame image I'(j) in a digital video V' to be authenticated frame by frame in sequence, where j=0, 1, . . . , t'-1, t' representing the total number of frames in the digital video V';
acquiring any one frame image in the read digital video V', determining the size of the frame image and marking as m'×n', where m' represents the number of rows of the frame image and n' represents the number of columns of the frame image, and determining the position coordinate of each pixel in the frame image in sequence, the coordinate of the bottom left corner pixel position being (0,0) and the coordinate of the top right corner pixel position being (m'-1, n'-1);
setting tt=0, w=" ";
reading a to-be-authenticated image block B'(tt) obtained in a frame image P(tt), the bottom left corner position coordinate of the to-be-authenticated image block B'(tt) being (x,y) and the top right corner position coordinate thereof being (x-1+half_m', y-1+half_n'), the size of the to-be-authenticated image block B'(tt) being half_m'×half_n', where 0≤x<half_m', 0≤y<half_n', x=V_key mod half_m', y=V_key mod half_n', where V_key=MD5(key1), half_m'=Trunc(m'/2), half_n'=Trunc(n'/2), key1 is a key, MD5 is a Hash function, Trunc( ) is a truncate function, and mod is a modulus function;
calculating a grayscale value mean mean'(tt) for each pixel point in the to-be-authenticated image block B'(tt);
selecting the pixel points in the to-be-authenticated image block B'(tt) with grayscale values not less than the grayscale value mean mean'(tt) to compose a set H'_set, and calculating the number H'(tt) of elements in the set H'_set;
if H'(tt)=half_m'×half_n', not performing extraction operation on the to-be-authenticated image block B'(tt);
otherwise, if H'(tt) is an even number, then w=w∥"0", where "∥" indicates string concatenation;
otherwise, if H'(tt) is an odd number, then w=w∥"1", where "∥" indicates string concatenation;
if tt+1<t', then tt=tt+1;
traversing all the frame images in the digital video V' to be authenticated and extracting a secret bit string w; and
carrying out a bit string restoration and a secret information restoration from the extracted secret bit string w through a voting model according to the key2, and then judging according to the restored secret information whether the content of the digital video has been tampered so as to realize the security authentication of the digital video content.

4. A computer readable storage medium non-transitory having instructions stored thereon which, when executed by a computer, causes the computer to perform
a secret information embedding operation, which is configured to selectively modify a pixel grayscale value for each frame image in a digital video so as to complete the embedding of 1-bit secret information; and
a secret information extraction and video authentication operation, which is configured to carry out secret information extraction from the digital video in which the secret information is embedded according to a key so as to realize the security authentication of the digital video content;
characterized in that the secret information embedding operation is specifically configured to:
read each frame image I(j) in the digital video V frame by frame in sequence, where j=0, 1, . . . , t-1, t representing the total number of frames in the digital video V;
acquire any one frame image in the read digital video V, determine the size of the frame image and mark as m×n, where m represents the number of rows of the frame image and n represents the number of columns of the frame image, wherein, in the frame image, each pixel has a coordinate, the coordinate of the bottom left corner pixel position is (0,0) and the coordinate of the top right corner pixel position is (m-1, n-1);
convert the secret information to be embedded into a bit sequence w(i), i=0, 1, . . . , s-1; if the secret information is a character string, express the length of the character string using $m_1$ and take it as a key2; if the secret information is a binary image, perform raster scanning on the binary image to obtain a bit sequence, the size of the bit sequence being s=$m_1$×$n_1$, where $m_1$ and $n_1$ respectively represent the number of rows and the number of columns of the binary image, at this time, $m_1$ and $n_1$ serving as a key2;
set tt=0, ss=0;
read the bit information w(ss) in the bit sequence;
read a selected image block B(tt) obtained in a frame image I(tt), the bottom left corner position coordinate of the selected image block B(tt) being (x,y) and the top right corner position coordinate thereof being (x-1+half_m, y-1+half_n), the size of the selected image block B(tt) being half_m×half_n, where 0≤x<half_m, 0≤y<half_n, x=V_key mod half_m, y=V_key mod half_n, V_key=MD5(key1), half_m=Trunc(m/2), half_n=Trunc(n/2), key1 is a key, MD5 is a Hash function, Trunc( ) is a truncate function, and mod is a modulus function;

calculate a grayscale value mean mean(tt) for each pixel point in the selected image block B(tt);

select the pixel points in the selected image block B(tt) with grayscale values not less than the grayscale value mean mean(tt) to compose a set H_set, calculate the number H(tt) of elements in the set H_set, and calculate the position coordinate (Hx,Hy) and the grayscale value H_v=p(Hx,Hy) that are corresponding to the pixel point with the minimum grayscale value in the set H_set;

select the pixel points in the selected image block B(tt) with grayscale values less than the grayscale value mean mean(tt) to compose a set L_set, and calculate the position coordinate (Lx,Ly) and the grayscale value L_v=p(Lx,Ly) that are corresponding to the pixel point with the maximum grayscale value in the set L_set;

complete the embedding of 1-bit secret information according to the value of the bit information w(ss) and the parity of the element number H(tt);

calculate ss=(ss+1) mod s, if tt+1<t, then tt=tt+1; and traverse all the frame images in the digital video V, end the secret information embedding process after the secret bit information is embedded in sequence, and acquire a digital video V' containing secret information.

5. The computer readable storage medium according to claim 4, characterized in that the secret information extraction and video authentication operation is specifically configured to:

read each frame image I'(j) in a digital video V' to be authenticated frame by frame in sequence, where j=0, 1, . . . , t'−1, t' representing the total number of frames in the digital video V';

acquire any one frame image in the read digital video V', determine the size of the frame image and mark as m'×n', where m' represents the number of rows of the frame image and n' represents the number of columns of the frame image, and determine the position coordinate of each pixel in the frame image in sequence, the coordinate of the bottom left corner pixel position being (0,0) and the coordinate of the top right corner pixel position being (m'−1, n'−1);

set tt=0, w=" ";

read a to-be-authenticated image block B'(tt) obtained in a frame image P(tt), the bottom left corner position coordinate of the to-be-authenticated image block B'(tt) being (x,y) and the top right corner position coordinate thereof being (x−1+half_m', y−1+half_n'), the size of the to-be-authenticated image block B'(tt) being half_m'×half_n', where 0≤x<half_m', 0≤y<half_n', x=V_key mod half_m', y=V_key mod half_n', where V_key=MD5(key1), half_m'=Trunc(m'/2), half_n'=Trunc(n'/2), key1 is a key, MD5 is a Hash function, Trunc( ) is a truncate function, and mod is a modulus function;

calculate a grayscale value mean mead(tt) for each pixel point in the to-be-authenticated image block B'(tt);

select the pixel points in the to-be-authenticated image block B'(tt) with grayscale values not less than the grayscale value mean mead(tt) to compose a set H'_set, and calculate the number H'(tt) of elements in the set H'_set;

if H'(tt)=half_m'×half_n', not perform extraction operation on the to-be-authenticated image block B'(tt);

otherwise, if H'(tt) is an even number, then w=∥"0", where "∥" indicates string concatenation;

otherwise, if H'(tt) is an odd number, then w=wƒ"1", where "∥" indicates string concatenation;

if tt+1<t', then tt=tt+1;

traverse all the frame images in the digital video V' to be authenticated and extract a secret bit string w; and carry out a bit string restoration and a secret information restoration from the extracted secret bit string w through a voting model according to the key2, and then judge according to the restored secret information whether the content of the digital video has been tampered so as to realize the security authentication of the digital video content.

* * * * *